United States Patent [19]

Altieri et al.

[11] Patent Number: 4,864,672

[45] Date of Patent: Sep. 12, 1989

[54] DOCKPLATE

[76] Inventors: John A. Altieri, 58 Cloverdale Rd.; Joseph W. Altieri, Jr., 16 Elkhurst Dr., both of Cheektowaga, N.Y. 14225

[21] Appl. No.: 165,254

[22] Filed: Mar. 7, 1988

[51] Int. Cl.[4] .............................................. E01D 1/00
[52] U.S. Cl. ........................................ 14/69.5; 14/71.1
[58] Field of Search ...................... 14/69.5, 71.1, 72.5; 193/38, 41; 414/537; 238/10 R

[56] References Cited

U.S. PATENT DOCUMENTS

| 426,209 | 4/1890 | McIntyre | 14/69.5 |
| 2,449,829 | 9/1948 | Agren | 14/69.5 |
| 2,595,533 | 5/1952 | Mullen et al. | 193/41 X |
| 2,670,484 | 3/1954 | Bintliff et al. | 14/72.5 |
| 2,779,958 | 2/1957 | Hodges et al. | 14/69.5 |
| 3,639,935 | 2/1972 | Kumpolt | 14/69.5 |
| 3,818,528 | 6/1974 | Petersen | 14/69.5 |
| 3,936,898 | 2/1976 | Poe | 14/69.5 |
| 4,127,201 | 11/1978 | Baumann | 14/69.5 X |
| 4,443,905 | 4/1984 | Kopp | 14/69.5 |
| 4,796,537 | 1/1989 | Besser | 414/537 X |

FOREIGN PATENT DOCUMENTS

| 710989 | 6/1965 | Canada | 14/72.5 |
| 398326 | 3/1966 | Switzerland | 14/69.5 |
| 447948 | 3/1968 | Switzerland | 14/69.5 |
| 688285 | 3/1953 | United Kingdom | 14/69.5 |
| 1038445 | 8/1966 | United Kingdom | 14/69.5 |
| 1269951 | 4/1972 | United Kingdom | 14/69.5 |
| 1282566 | 7/1972 | United Kingdom | 14/72.5 |

Primary Examiner—Jerome W. Massie, IV
Assistant Examiner—Matthew Smith
Attorney, Agent, or Firm—James J. Ralabate

[57] ABSTRACT

A novel dockplate is made up of three pieces, hinge-connected together to form a safe bridging means. The end pieces or plates of the three-piece structure have breaks to permit a minimum angle incline when the dockplate is in use. The center or main portion of the dockplate has a base which lifts it above the upper planes of both end pieces.

6 Claims, 2 Drawing Sheets

DOCKPLATE

This invention relates to a novel dockplate and, more particularly to a dockplate that is safe, portable and easy to use when bridging surfaces of different elevation.

BACKGROUND OF THE INVENTION

There have been many attempts made to provide a safer dockplate that can be used not only between surfaces that are relatively even but also between surfaces of different elevations. It is not uncommon when loading or unloading a truck that the loading platform will be of a different elevation or height than the truck cargo surface. To accommodate this difference in height, a bridge is needed that makes the transfer of goods either way (i.e. from truck to dock or visa-versa) as easy as possible.

As early as 1890 U.S. Pat. No. 426,209, issued to McIntyre which disclosed a gangplank that was intended for use as a bridge that would span a ship deck and a dock of different heights. In the McIntyre patent, a three-piece structure is disclosed that has a central main portion A and two toeboards B, one on each end of the main portion A. Toeboards B are connected to main portion A by an easily detachable hook and eye where hooks b' enter eyes a' in the main portion A. The gangplank is disassembled by removing the hook from the mating eye and is intended for rapid attachment and detachment. The bottom portion of the gangplank has projections a and b for lifting all three parts of the gangplank above the surface of the deck and dock. The middle or main portion A of the McIntyre McIntyre structure is used as the bridge, that is, the piece that spans the opening between dock and deck. The toeboards B act as the anchors, one resting on the dock and the other resting on the deck. Since the middle portion A of McIntyre is always used as the bridge, during use excessive angles are formed between the dock toeboard B and the main portion A (see FIG. 3 of McIntyre) which is acceptable for people disembarking from a ship but would be unacceptable for loading or unloading cargo. If, for example, a truck or dolly was being pushed from deck to dock of FIG. 3, there would be a very steep upward incline to overcome and would require a great deal of effort. On the other hand, moving goods from dock to deck or from a loading platform to a truck (in the deck position) a sharp downward incline would occur. Since McIntyre's main portion A and toeboard B are both occupying space on the deck or truck surface, this would take away from the space available for cargo. If the truck or deck was higher than the dock surface of McIntyre, the toeboard B would cause an uneven surface to be formed as will be described in relation to the drawings. Thus, the drawbacks of the McIntyre structure for use in present day situations of truck to loading dock or loading dock to truck are:

a. easy disengagement of toeboards B from the main portion A which could cause a dangerous condition on heavy loads;

b. requirement that main portion A be used as the bridge and thus the resulting steep inclines and angles formed which would make loading and unloading difficult;

c. limitation of cargo space in truck (or deck) caused by the substantial amount of space taken up by the main portion A and all of the lateral dimensions of toeboard B.

In FIG. 3 of McIntyre it is obvious that in the lower righthand surface which would be the truck cargo area, a great deal of space must be occupied by McIntyre's device. Also in McIntyre, platforms on the toeboards which raise the toeboards above the surface provide a convenient gangplank for even surfaces but not particularly suitable for bridging surfaces of uneven heights.

In Baumann U.S. Pat. No. 4,127,201, an unloading ramp is disclosed which is attached to a super-structure of a truck. In Baumann's ramp, it is not possible to transport loads upward, that is, from a truck to a higher elevation. Also, Baumann's device is relatively complex and expensive and cannot be easily moved from one location to another. Because it is attached to a vehicle, it has inherent disadvantages such as portability, simplicity and upward loading use.

In the Agren U.S. Pat. No. 2,449,829, a portable ramp is disclosed wherein the ramp is moved on permanantly attached wheels. Again, the Agren device is relatively complex and expensive. Also, the center plate or portion 8 of Agren must be used as the bridge since the support means 14 is used to hold up center portion 8. If end plates 10 or 10' of Agren was used as the bridge, there would be no support and the end plate would collapse under a load. In order to accommodate different heights or elevations of loading docks or trucks, Agren relies upon a tilting center plate. Again, pushing a heavy load up the center plate incline (as shown in Agren FIG. 3) would involve a great deal of effort.

In Kopp U.S. Pat. No. 4,443,905 a loading ramp is disclosed having a two-plate structure. The plates are hinged by a hinge member having depending feet which hold the two plates slightly elevated along the center hinge portion. Kopp does not disclose a structure having a center or middle baseplate that would remain flat in use and alleviate the presence of steep inclines or angles. Since Kopp has no center plate but rather two folding plates that form a peak when extended, there always exists a gap between the plates. This gap becomes larger in proportion to the length of the feet 44. Thus, when feet 44 are made longer, the gap between plates 22 and 24 of Kopp becomes dangerously large. This gap could become a safety hazard when the feet are lengthened yet if the feet are short, the ramp becomes less convenient for use with platforms of different heights.

In U.S. Pat. No. 3,639,935 to Kumpolt a dock platform having a liftable wing on one side thereof is disclosed. The massive Kumpolt structure could not be used as a loading ramp other than on a dock where it can be readily moved. The complex parts such as hydraulics, coil springs, tri-pedals, etc. make the Kumpolt structure relatively expensive and requires a constant degree of maintenance to keep operational. Any structure such as Kumpolt's with so many moving parts eventually becomes worn and requires replacement parts and repair. There is a need for a simply constructed, efficient ramp having no moving parts, relatively inexpensive and adaptable for use in a multitude of situations.

SUMMARY OF THE INVENTION

It is therefore an object of this invention to provide a dockplate devoid of the above-noted disadvantages.

Another object of this invention is to provide a relatively inexpensive and safe dockplate that is portable and is relatively maintenance-free.

Still a further object of this invention is to provide a dockplate that is strong and reliable in a plurality of situations and versatile.

Another further object of this invention is to provide a dockplate that is equally adapted for use when loading or unloading in an upward or downward direction.

Another still further object of this invention is to provide a dockplate that is anchored securely in its center portion thereby minimizing the possibility of collapse.

Yet another object of this invention is to provide a dockplate where a minimum of steep inclines or angles are formed during use.

Still yet a further object of this invention is to provide a sturdy dockplate where both terminal edges are substantially flush with the surfaces they are in contact with. This is particularly true when surfaces of different elevations are bridged.

A yet further object of this invention is to provide a dockplate that is equally efficient in use when bridging uneven surfaces or surfaces of the same elevation.

These and other objects of this invention will become apparent to one skilled in the art upon a further reading of this disclosure. These objects are accomplished generally speaking by providing a three-piece dockplate having a middle anchor plate or center portion and on both sides of the center portion an end plate. The two end plates are joined to the middle anchor plate or center portion by hinges that securely hold the main plate to each end plate in a movable manner. The center plate (middle anchor plate only) sits on top of a base. Each of the end plates has at least one break which is critical to the invention. These breaks not only add substantial strength to the end pieces but they significantly reduce the angle incline or steepness when the dockplate is in use. This is important because it becomes much easiler to push a dolly or other means up a ramp having a slight rather than severe incline. Also, because of these breaks, the terminal portions of each end plate can be made flush with the surface in contact therewith. If the end plates did not have breaks, the end plates would form a ridge or a rut with the surface it rested upon when used to bridge uneven surfaces or surfaces at different elevations. In the dockplate of this invention, unlike most of the prior art dockplates, the end piece is used as the bridge and not the middle anchor plate. This end piece will be referred to as the "bridge end piece" throughout this disclosure. This bridging is significant because the center piece is used to stabilize the structure and make it more secure during a loading operation. The center portion is adapted to remain substantially flat when in use thus providing a minimum of effort to push a load up the slight incline formed thereby. The permanent hinges connecting the main plate to the end plates hold the three-piece structure secure in use and, unlike a hook and eye arrangement, cannot become dislodged or disconnected no matter how extreme the load or pressure applied thereto. While the hinge in this invention is permanent and secure it is easily replaced or repaired when required. Any suitable, permanent hinge means can be used but it must be permanent and secure. Also, the outer surface of the hinge provides a smooth surface when the dockplate is opened for use. There is an absence of protrusions or gaps from the hinge that could cause a dolly or truck rolling over it to encounter obstacles or rough surfaces.

This present invention differs from prior art devices because of its three-plate, two-hinge and elevated middle-plate structure. These differences taken together with the breaks in each end plate provide a novel structure which is a substantial advance of the art of dockplates. It provides unexpedtedly better performance than prior art devices in all use situations including height differential use and use when there is no difference between truck beds and loading docks.

The breaks in the end plates run across the entire width of the end plate and, as earlier set out, add significantly to the strength of the end plates which is extremely important since one end plate is always used as the bridge spanning the space between the truck floor and the loading dock. The breaks also reduce the angle incline when used on different height surfaces. An important feature of the breaks is to eliminate the gap as formed by prior art terminal portions when they contact a flat supporting surface at a different elevation than the other end of the bridge.

Another essential feature of this invention is to position a base below the middle anchor plate or middle portion but not the end plates. Putting a base under the end plates would substantially dilute the utility of the invention. This provides the dockplate with stability by increasing the weight of the central portion which is used as the anchor for the bridge or end piece. This added weight (base for middle anchor plate) ensures that the dockplate will hold firmly in position when used but also provides additional advantages to the dockplate. Since the center portion is raised by the base, the breaks in the end plates can form a smooth interface with the loading dock or truck floor and avoids formation of gaps or ruts. If the center portion was not built up, the breaks at the terminal portion of each end plate would raise the terminal portions higher than the center portion in an " " type configuration and cause an irregular surface that would be difficult to transport a load over. Therefore, it is necessary to have both breaks in the end pieces and a weighted base supporting and raising the center portion.

The center portion or main plate is also adapted to remain substantially flat when in use to provide a travel surface with an absence of steep inclines and also to hold the bridge end piece in a substantially horizontal position at the point where it meets the main plate. If the center plate was not held in a flat or horizontal position during use there would be a relatively steep incline of the dockplate which would not only create a difficult loading effort but also could cause a dangerous situation such as slipping of the dockplate, etc.

The hinges connecting the main or center portion to the end plates not only firmly hold the structure together but provide a convenient means for the end plates to be folded up of easy transporting of the dockplate from one location to the other. A locking mechanism is preferably located on each side of the end plates for locking the end plates in a substantially vertical position when transporting the dockplate from one location to another. This locking mechanism can be a simple bar that is movably fixed to one side of an end plate and can be moved to connect and attach to the side of the end plate on the opposite side. A hook can be in the side of one end plate and an eye to connect to said hook in the other end plate. Also, it is preferred to position side rails on the center portion and both end plates to prevent the wheels of a dolly or truck from slipping off the side of the dock plate. The dimensions of the breaks in the end plates and the height of the base for the center portion should be such that when in use a minimum of incline surface is required when the dockplate is extended and bridging a space.

In the preferred embodiment the bridge end piece has two breaks, one approximately midway through its length and the other near the terminal end portion. The end plate on the reverse side ("ramp end plate") preferably has one break near the terminal end portion of the plate. Also, it is preferred to position side rails along all side portions of the middle plate, bridge plate and ramp plate. Also, the preferred embodiment has a locking bar that is fixed to the side of one end plate and is adapted to lock onto the side of the opposite end plate.

DESCRIPTION OF DRAWING AND PREFERRED EMBODIMENTS

Figure 1:
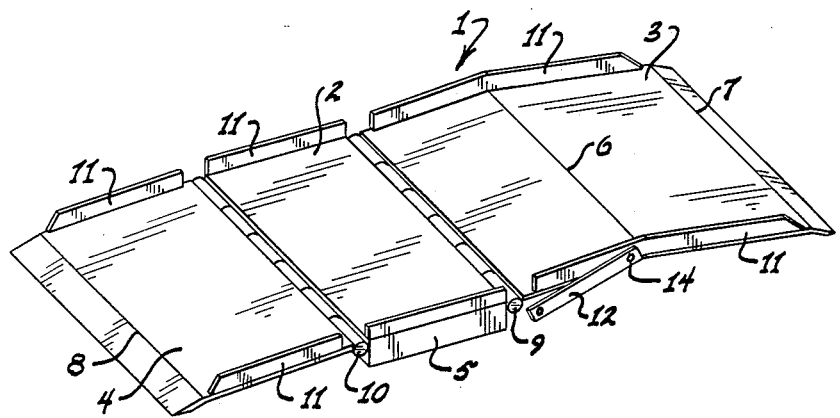
FIG. 1 is a perspective view of the portable dockplate of this invention.

In FIG. 1 the dockplate 1 is shown in its normal and not in one position comprising a middle anchor plate 2, a bridge end plate 3 and a ramp end plate 4. The middle anchor plate 2 when the dockplate is not in one and or a level surface has a weighted base portion 5 which holds the upper surface of the middle anchor plate above the upper surfaces of end plates 3 and 4. Each of the end plates 3 and 4 have breaks across their widths such as the breaks 6 and 7 in the bridging end plate 3 and break 8 in the ramp end plate 4. These breaks 6, 7 and 8 and the raised base portion 5 are both critical and essential to the present invention. One without the other would not permit the dockplate to function in the intended manner. Middle anchor plate 2 is movably connected to bridge end plate 3 by permanent hinge 9 and middle anchor plate 2 is movably connected to ramp end plate 4 by permanent hinge 10. When dockplate 1 is extended as shown in FIG. 1, the upper surfaces of end plates 3 and 4 taper slightly downward from the substantially level surface of middle anchor plate 2. The breaks 6, 7 and 8 allow only slight surface inclines to be formed even when dockplate 1 is bridging surfaces of uneven elevations. The bottom face of raised or weighted base portion 5 is substantially flat and adapted to rest on a secure surface when anchoring the dockplate 1 in place. Middle weighted anchor plate 2 is preferably maintained in a level position when in use so that it can properly anchor the bridging end piece 3 and securely hold it in position. On the longitudinal edges of the middle anchor plate 2 and end plates 3 and 4 are guide rails 11 which guard against the wheels of a dolly or truck from slipping off the dockplate 1. A locking bar 12 is attached at one end to the outside of side rail 11 of one end plate and is movable at its other end for attachment to the side rail of the opposite end plate.

Figure 2:
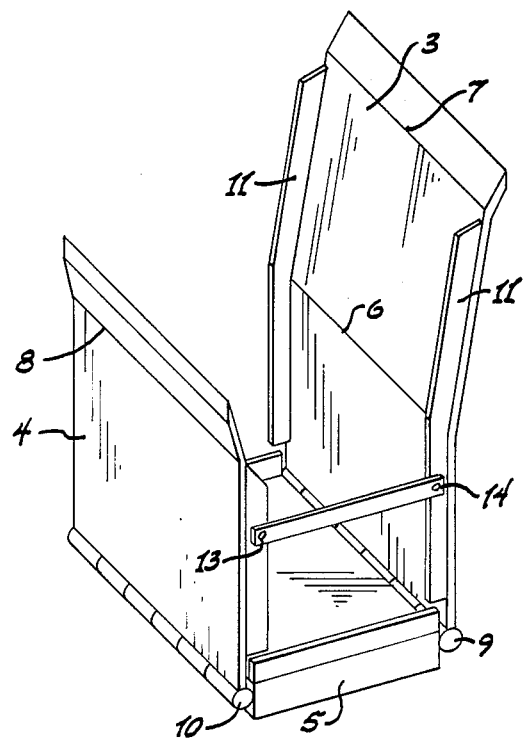
FIG. 2 is a perspective view of the dockplate of this invention when folded and ready to be transported from one location to another.

In FIG. 2 dockplate 1 is shown when folded for transporting from one location to another. Locking bar 12 is movably attached at 13 to the side rail 11 and can be extended to meet the side rail 11 of the opposite end plate to connect thereto at eyelet 14. Any suitable means may be used to connect one end plate to the other but the bar arrangement shown in FIG. 2 is preferred because of its reliability and simplicity. The base portion 5 is easily put on a dolly and dockplate 1 moved to the desired location.

Figure 3:
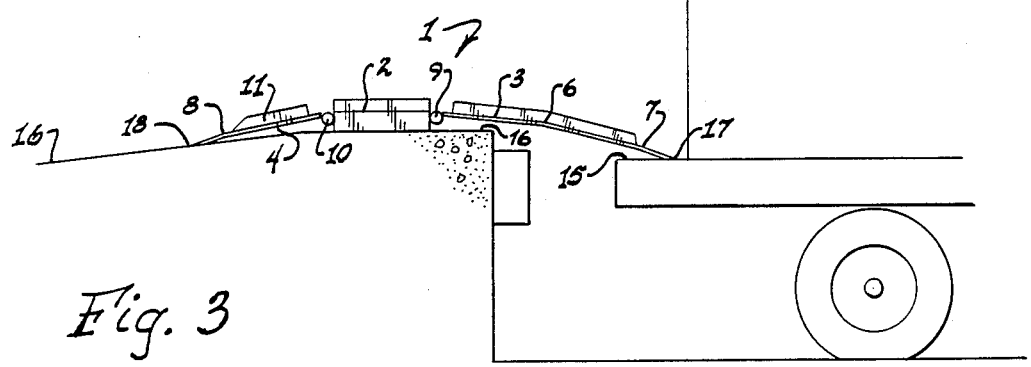
FIG. 3 is a side view of the dockplate of this invention when used to bridge a truck surface that is lower than the dock surface.

In FIG. 3 dockplate 1 is shown in use when the surface 15 of the truck is lower than the surface 16 of the dock. The bridging end plate 3 fits flush against the plane of truck surface 15 thereby providing a smooth path for a dolly or truck. This smooth interface is provided for by the breaks 6 and 7 which modify substantially the angle at which the surface of bridging end plate 3 tapers downwardly. Therefore, when the terminal end 17 of bridging end plate 3 meets the truck surface 15 there is no gap or uneven surface that would create an obstacle for a loading truck or dolly. The side rails 11 are not shown in this figure in order to clearly illustrate the other elements of the dockplate. In FIG. 3 the middle anchor plate 2 is maintained in a level position and is held securely and firmly on dock surface 16. The space between the dock and the truck is bridged solely by bridging end plate 3 which can accommodate surfaces of varying elevations. Bridging end plate 3 is securely connected to the middle anchor plate 2 by a hinge means 9, hinge means 9 allows end plate 3 to be swung to any position along an arc of about 180°. As clearly shown in the drawing of FIG. 3 the dockplate 1 can be easily used in situations where there is a significant difference in the elevations of the dock and truck; in this case where the truck surface 15 is lower than that of the dock surface 16. The break 8 in dock end plate 4 also provides a smooth interface where dock end plate terminal end 18 meets surface 16. Also, since bridging end plate 3 has breaks 6 and 7, very little space is taken up from the loading surface 15 of the truck. In many cases, prior art dockplates require a substantial amount of space on the truck floor 15 in order to provide a secure interface.

Figure 4:
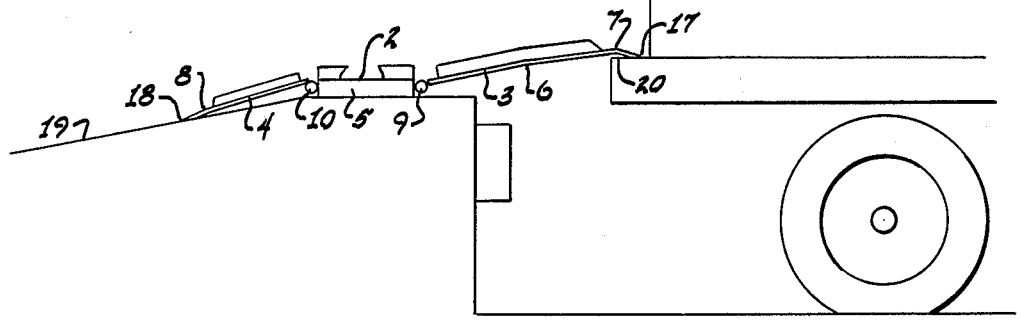
FIG. 4 is a side view of the dockplate of this invention when used to bridge a truck surface that is higher than the dock surface.
Figure 6:
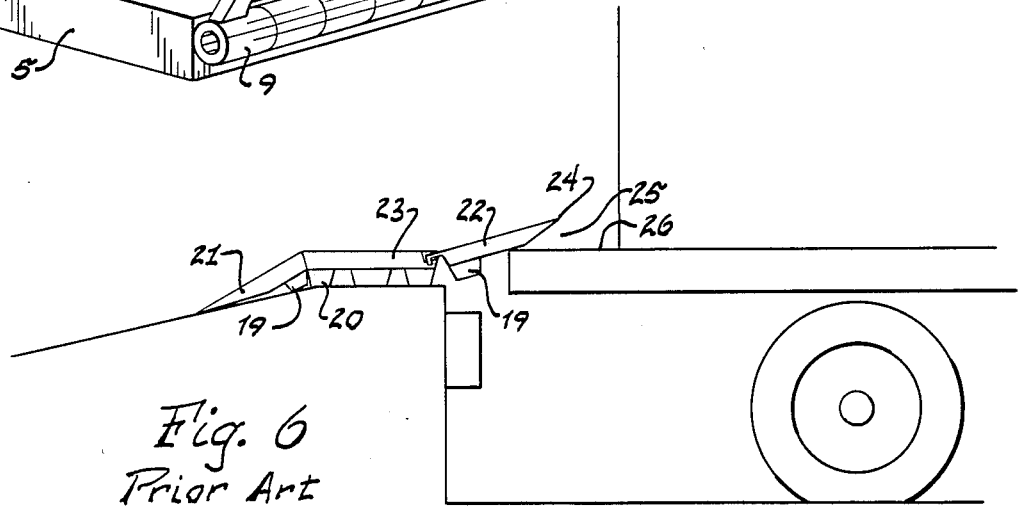
FIG. 6 is a side view illustrating a prior art dockplate and the problem encountered when used to bridge a truck surface that is higher than the dock surface.

In FIG. 4 dockplate 1 is shown in use where the dock surface 19 is lower than the truck loading surface 20. Dockplate 1 is equally as useful whether the truck loading surface is the same as, is higher or lower than the dock surface. Base portion 5 and middle anchor plate 2 are firmly located on the loading platform surface 19 and bridging end plate 3 is extended upward to meet the truck surface 20. It is to be noted that terminal 17 of bridging end plate 3 forms a very smooth interface with truck surface 20 in part because of break 7 which allows the end surface of bridging end plate 3 to taper downwardly without forming a gap with the truck floor 20. Again, anchor middle plate 2 rests firmly on dock surface 19 as bridging end plate 3 spans the opening between the dock surface 19 and the truck surface 20. It is significant that very little space on the truck loading surface 20 is taken up by the smooth interface with the end portion of bridging end plate 3. Compare this with the prior art device as shown in FIG. 6 where a gap is formed at this same interface. The absence of any steep inclines is evident from FIG. 4. This is provided for by all these essential features:

a. the base under or build up of only the middle plate 2;
  b. the two breaks 6 and 7 of end plate 3; and
  c. the break 8 in end piece 4.

Figure 5:
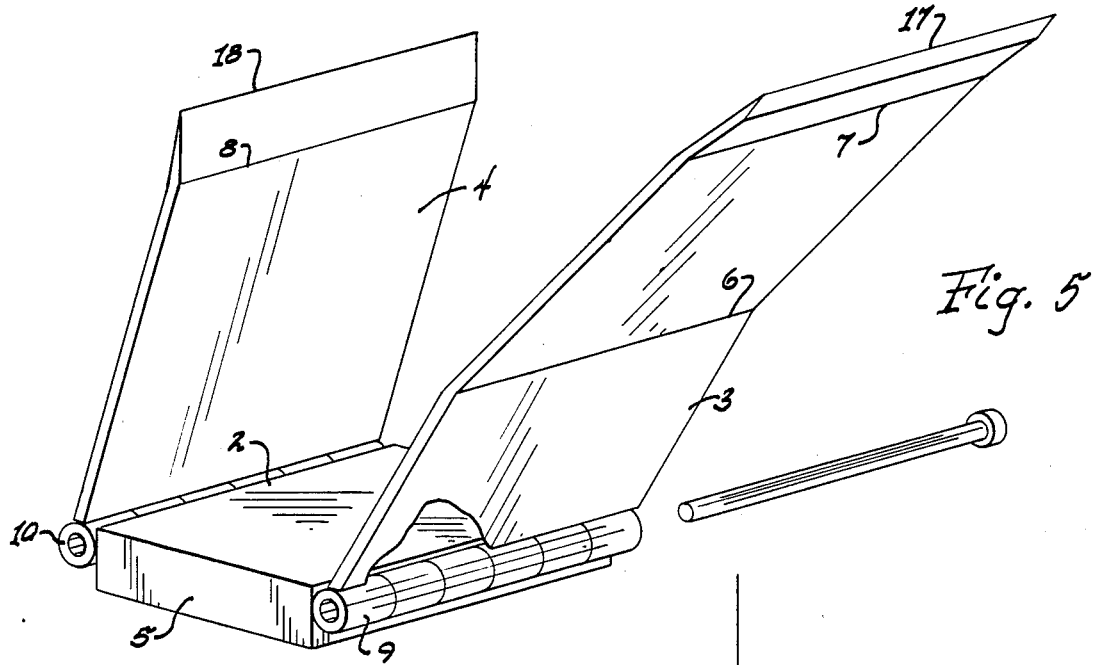
FIG. 5 is a perspective view of the dockplate of this invention clearly showing the secure hinge arrangement connecting each end plate to the main plate.

In FIG. 5 the dockplate 1 is shown having end pieces 3 and 4 lifted to illustrate the movable hinge means 9 and 10. Hinge 9 connects bridge end piece 3 to middle plate 2 and base 5. Plate 4 and plate 3 can swing upward or downward along an arc of about 180°. These plates are moved to the upward extreme position when the dockplate 1 is folded for transporting from one location to another. The side rails 11 and locking means 12 are not shown in this figure so that the other elements can be clearly illustrated. Breaks 6 and 7 in the bridging end plate 3 and break 8 in the ramp or dock end plate 4 are clearly shown in perspective. The weighted base portion 5 is shown as it will lift middle plate 2 above the plane of the terminal ends 17 and 18 of end plates 3 and 4.

In FIG. 6 a prior art three-piece device is shown whereby there are bases 19 under each end plate 21 and 22 in addition to base 20 under the middle plate 23. These bases 19 and 20 together with the absence of breaks cause the terminal end 24 of bridging end plate 22 to form a large gap 25 at the interface with floor 26 of the truck. The device of the present invention, because of only a base build up 5 (see FIGS. 3 and 4) and breaks 6, 7 and 8, avoid the dangerous formation of this gap 25 at the interface. When unloading a truck, this gap 25 can cause a truck or dolly to hit terminal end 24 and knock the dockplate off the truck.

The preferred and optimumly preferred embodiments of the present invention have been described herein and shown in the accompanying drawing to illustrate the underlying principles of the invention, but it is to be understood that numerous modifications and ramifications may be made without departing from the spirit and scope of this invention.

What is claimed is:

1. A novel three-piece dockplate in its normal opened and unused mode comprising in combination a center weighted main plate, a ramp end plate and a bridging end plate, said end plates movably connected by connecting means along their lateral interior positions to said main plate, said main plate and said end plates having side rails along their longitudinal outer portions, said side rails positioned at right angles to the upper surface of said main and said end plates, said main plate being of uniform height above a horizontal level support surface and having a base thereunder for lifting said main plate above a plane of the terminal portions of said end plates, said base positioned only under said main plate, said ramp end plate having at least one break therein, said bridging end plate having at least two breaks therein, said terminal portions of said end plates tapered via said breaks downwardly at an angle from the remainder of said end plates.

2. The dockplate of claim 1 wherein a locking bar is fixed and positioned on an outer edge of one of said end plates, said bar adapted to lock said end plates together when not in use.

3. The dockplate of claim 1 wherein said bridging end plate is longer than said ramp end plate.

4. A novel three-piece dockplate in its normal and unused open position comprising in combination a center main plate, a ramp end plate and a bridging end plate, said ramp end plate and said bridging end plate connected on opposite sides by connection means to said center plate, said center main plate being level and of uniform height above the surface of a level support surface and having thereunder a weighted base or foundation, said base positioned only under said center main plate, when said entire dockplate is resting on said level support surface said weighted base lifts said center main plate above the planes of terminal ends of said ramp and bridging end plates, said ramp end plate and said bridging end plate having at least one break therein, said breaks adapted to reduce the angles of incline of upper surfaces of said ramp end plate and said bridging end plate, and wherein said connection means are hinges that permit said end plates to move to positions along an arc of about 180 degrees.

5. The dockplate of claim 4 wherein said ramp end plate has at least one break therein and said bridging end plate has at least two breaks therein.

6. The dockplate of claim 4 wherein said ramp end plate has one break therein and said bridging end plate has two breaks therein.

* * * * *